Patented Feb. 21, 1933

1,898,908

UNITED STATES PATENT OFFICE

GEORGE T. SOUTHGATE, OF FOREST HILLS, NEW YORK, ASSIGNOR TO UNION CARBIDE & CARBON RESEARCH LABS. INC., A CORPORATION OF NEW YORK

WELDING ROD

No Drawing.  Application filed February 10, 1931. Serial No. 514,911.

My invention relates to welding rods and especially to a coated welding rod adapted for use in arc welding. An object of my invention is to devise a welding rod which shall have a coating that is conductive so that it will be unnecessary to remove the coating from a portion of the rod to enable contact to be made. Another object of my invention is to produce a rod having a coating which shall assist in the stabilization of the arc. A further object of my invention is to produce a rod having a coating which shall protect the deposited weld metal from excessive oxidation and from nitrification. These and other objects of my invention will be evident from the following specification.

In carrying out one embodiment of my invention I coat a rod or wire, composed principally of iron, with a mixture containing carbon, an alkali or an alkaline earth and a metal which forms an alloy with iron. The alkali or alkaline earth may be in the form of an oxide or may be in a salt. While I have found calcium, barium, and strontium compounds, especially suitable for this purpose I prefer to use compounds of calcium because of their cheapness. The ferro-alloy-forming metal may be included in the coating as an oxide, or in the acid radical of a salt of the alkali metal or alkaline earth metal. I have found that chromium, tungsten, molybdenum, zirconium, titanium and cerium are well suited for this purpose because of their denitrifying properties. In most cases I prefer to use calcium chromate in the coating by virtue of its relative cheapness and readier availability. The carbon may be introduced into the coating by using an organic binder which is carbonized during baking. Another way of introducing the carbon is to employ colloidal graphite in the coating mix. The carbon serves to increase the conductivity, and also serves to reduce the ferro-alloying metal. It is also frequently desirable to include silica for the purpose of assisting in forming a protective coating of slag. The constituents of the coating may be mixed with water and applied to the rods by dipping or brushing. If the rods are to be roughly handled it may be desirable to include a small amount of glue or other adhesive substance especially in cases where colloidal graphite is not used.

In preparing welding rods in accordance with my invention I prefer to use a coating made up in accordance with one of the following formulæ:

$CaO.CrO_3$, 4 to 5 parts; C, 1 part; $SiO_2$, 3 parts.

$CaO.MoO_3$, 5 to 6 parts; C, 1 part; $SiO_2$, 3 parts.

$CaO.WO_3$, 7 to 9 parts; C, 1 part; $SiO_2$, 3 parts.

$CaO.TiO_2$, 4 to 5 parts; C, 1 part; $SiO_2$, 3 parts.

$CaO.CeO_2$, 6 to 8 parts; C, 1 part; $SiO_2$, 3 parts.

$CaO.ZrO_2$, 5 to 6 parts; C, 1 part; $SiO_2$, 3 parts.

The carbon ratio given above is that for free carbon. When an organic binder is employed it should be used in such proportion that upon carbonization the above ratio holds. The proportion of silica may be varied within relatively wide limits. However the use of three parts of silica in the above stated formulæ gives a satisfactory slag formation. Instead of calcium I may use other alkaline earths or even oxides, hydroxides or salts of alkali metals.

A rod prepared in accordance with my invention has numerous advantages among which may be mentioned the protection of the welding metal during deposition and cooling against attack of oxygen, nitrogen or other gases; the improvement in the quality of the deposited metal and of the surrounding body metal; the increase of penetration of the weld metal; and the fact that the coating is conductive thereby adapting the coated rod for use with automatic welding machines. These advantages are due in part to the stability of the constituents at very high temperatures thus minimizing decomposition in advance of actual fusion. Also the alkaline-earth metals employed have very high arc stabilizing properties. Furthermore, the quantities of salts or oxides of the metals required are so low that the coating of slag is relatively thin. The other metals employed in the coating, such as chromium, are cleansing agents due to their power of combining with nitrogen, transferring it to the slag and preventing its combining with the deposited ferrous metal.

I claim:

1. A welding rod comprising a core predominantly of iron and an electrically conductive coating thereon, comprising substantially one part of carbon, four to nine parts of a compound of an alkaline earth metal and a nitrogen-combining ferro-alloy-forming metal or equivalent mixture of oxides, and substantially 3 parts of a slag-forming material.

2. A welding rod comprising a core predominantly of iron and an electrically conductive coating thereon, comprising substantially one part of carbon, substantially three parts of silica and from four to nine parts of an oxygen containing compound of an alkaline earth metal and a nitrogen-combining ferro-alloy-forming metal or equivalent mixture of oxides.

3. A welding rod comprising a core predominantly of iron and an electrically conductive coating thereon, said coating comprising substantially one part of graphite, from four to nine parts of an oxygen containing compound of an alkaline earth metal and a nitrogen-combining ferro-alloy-forming metal or equivalent mixture of oxides, and substantially 3 parts of a slag-forming material.

4. A welding rod comprising a core predominantly of iron and a coating thereon comprising an oxygen-containing compound of an alkaline earth metal and a nitrogen-combining ferro-alloy-forming metal, a slag-forming material and carbon, the carbon being present in an amount sufficient to reduce to the metallic state the second-named metal, and the slag-forming material being present in an amount greater than the carbon and less than said oxygen-containing compound.

5. A welding rod consisting of a core predominantly of iron and a coating thereon comprising carbon one part, compounds of calcium and chromium substantially 4 to 5 parts and silica substantially 3 parts.

6. A welding rod comprising a core predominantly of iron and a coating thereon comprising graphite one part, compounds of calcium and chromium substantially 4 to 5 parts and silica substantially 3 parts.

7. A welding rod comprising a core predominantly of iron and a coating thereon comprising calcium chromate substantially 4 to 5 parts, graphite one part and silica substantially 3 parts.

8. A welding rod comprising a core predominantly of iron and a coating thereon comprising carbon one part, oxygen-containing compounds of alkaline earth metal and titanium substantially 4 to 5 parts and silica substantially 3 parts.

9. A welding rod as claimed in claim 8 in which the alkaline earth metal is calcium.

10. A welding rod comprising a core predominantly of iron and a coating thereon, said coating comprising an oxygen-containing compound of tungsten and an alkaline earth metal in equivalent molecular portions or equivalent mixtures of the oxides of tungsten and an alkaline earth, sufficient carbon to reduce the tungsten to the metallic state and silica in an amount greater than the carbon and less than the compounds of tungsten and alkaline earth metal.

11. A welding rod comprising a core predominantly of iron and a conductive coating thereon, said coating comprising substantially one part of carbon, substantially three parts of silica and substantially seven to nine parts of an oxygen containing compound of calcium and tungsten.

In testimony whereof, I affix my signature.

GEORGE T. SOUTHGATE.